(12) United States Patent
Gustof et al.

(10) Patent No.: US 12,411,718 B2
(45) Date of Patent: Sep. 9, 2025

(54) METHOD AND CLOUD-BASED RESOURCE MANAGEMENT SERVICE FOR OPTIMIZING A RESOURCE SHARING PROCESS

(71) Applicant: MOTOROLA SOLUTIONS, INC., Chicago, IL (US)

(72) Inventors: Grzegorz Gustof, Myslenice (PL); Piotr Furman, Grojec (PL); Albert Dabrowski, Cracow (PL); Wojciech Wojcik, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 500 days.

(21) Appl. No.: 17/904,298

(22) PCT Filed: Jun. 5, 2020

(86) PCT No.: PCT/PL2020/050046
§ 371 (c)(1),
(2) Date: Aug. 16, 2022

(87) PCT Pub. No.: WO2021/246881
PCT Pub. Date: Dec. 9, 2021

(65) Prior Publication Data
US 2023/0092091 A1  Mar. 23, 2023

(51) Int. Cl.
*G06F 9/50* (2006.01)
(52) U.S. Cl.
CPC .......... *G06F 9/5072* (2013.01); *G06F 9/5083* (2013.01)
(58) Field of Classification Search
None
See application file for complete search history.

(56) References Cited

U.S. PATENT DOCUMENTS 10,009,877 B2   6/2018  Chai et al.
11,307,898 B2 *  4/2022  Gauthier ............... G06F 9/5038
(Continued)

FOREIGN PATENT DOCUMENTS

JP   2007299401 A1   11/2007
WO  2010101935 A1    9/2010

OTHER PUBLICATIONS

Gramaglia et al., Flexible Connectivity and QoE/QOS Management for 5G Networks: the 5G Norma view, 2016, IEEE International Conference on Communications Workshops (ICC), Kuala Lumpur, Malaysia, pp. 1-7 (Year: 2016).*

(Continued)

*Primary Examiner* — Bradley A Teets
*Assistant Examiner* — Melissa A Headly

(57) ABSTRACT

A method and cloud-based resource management service is provides for optimizing a resource sharing process in a multi-tenant communication system. A resource sharing process is established electronically between a first tenant and a second tenant in the multi-tenant communication system. The resource sharing process establishes a first expected resource usage at the first tenant and a second expected resource usage at the second tenant. The cloud-based resource management service determines electronically a first actual resource usage at the first tenant and a second actual resource usage at the second tenant. The cloud-based resource management service utilizes electronically the first actual resource usage and the second actual resource usage to recommend modification of the resource sharing process.

14 Claims, 3 Drawing Sheets

(56) References Cited

U.S. PATENT DOCUMENTS

| | | |
|---|---|---|
| 2014/0379922 A1 | 12/2014 | Xiao et al. |
| 2018/0205666 A1 | 7/2018 | Nash |
| 2018/0287898 A1* | 10/2018 | Bellini, III .......... H04L 41/5009 |
| 2019/0042322 A1 | 2/2019 | Calhoun et al. |

OTHER PUBLICATIONS

Yousaf Zarrar (nee) et al: "Definition of connectivity and QoE/QoS management mechanisms—intermediate report—5G Norma D5.1 Deliverable", Nov. 30, 2016 (Nov. 30, 2016), XP055348936, Retrieved from the Internet:URL: https://5gnorma.5g-ppp.eu/wp-content/uploads/2016/12/Sg norma d5-I.pdf, [retrieved on Feb. 23, 2017] pp. 36-43.

The PCT International Search Report and the Written Opinion, corresponding patent application No. PCT/PL2020/050046 filed Jun. 5, 2020 all pages.

\* cited by examiner

141

METHOD AND CLOUD-BASED RESOURCE MANAGEMENT SERVICE FOR OPTIMIZING A RESOURCE SHARING PROCESS

BACKGROUND OF THE INVENTION

In next generation cloud-based multi-tenant communication systems, neighboring communication systems can have overlap in their over the air coverage. It can make sense for these adjacent communication systems to enter into agreements wherein they can use the channels or frequencies of the adjacent operator in certain scenarios.

These scenarios can be difficult to predict. Communication systems can make estimates for times when their systems are heavily utilized, but oftentimes an event or incident can lead to a need for increased capacity and bandwidth when it is not expected.

Therefore a need exists for a method and management service for being able to adapt a process to allow for unexpected incidents and increased load.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
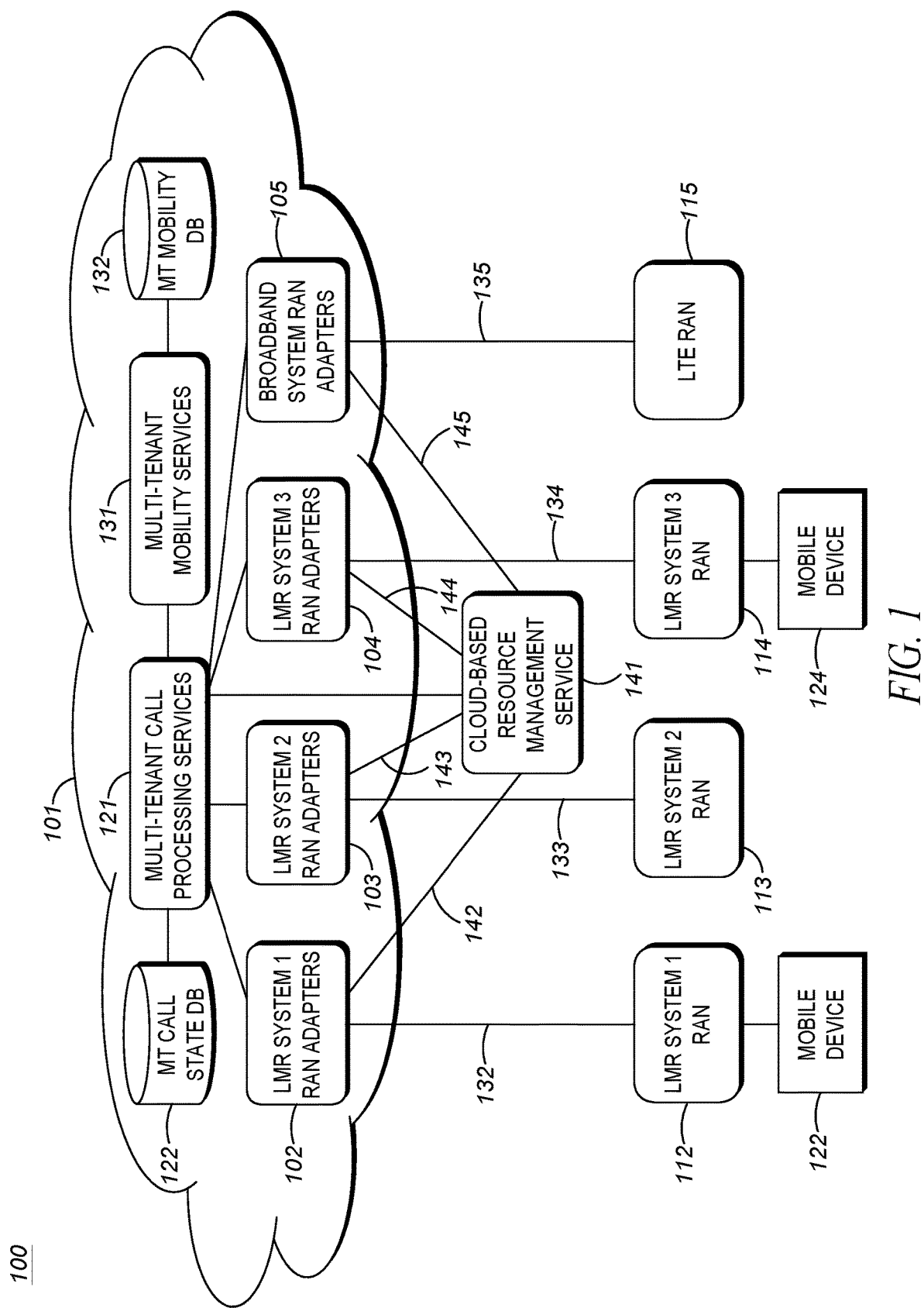
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

FIG. 1 depicts a system diagram of a communication system 100 in accordance with an exemplary embodiment of the present invention. Communication system 100 comprises Call Processing System 101, Land Mobile Radio (LMR) System RAN 112, LMR System RAN 113, LMR System RAN 114, and Long Term Evolution (LTE) System RAN 115. Although only four Radio Frequency (RF) systems (112-115) are shown in FIG. 1 for clarity, it should be understood that communication system 100 could include additional or fewer RF systems. In addition, the type of RF systems within communication system 100 can vary, and can include all RF systems of a single type or any combination of compatible RF systems. Depending on the standard, mobile phones and other wireless connected devices are varyingly known as user equipment (UE), terminal equipment, wireline console dispatchers, mobile stations (MS), mobile units, mobile devices, and by other similar names.

A RAN is part of a mobile telecommunication system that implements a radio access technology. In exemplary systems, a RAN resides between a device, such as a mobile phone, a computer, or any remotely controlled machine, and provides connection with a core network, such as Call Processing System 101.

Call Processing System 101 preferably includes LMR System 1 RAN Adapters 102, LMR System 2 RAN Adapters 103, LMR System 3 RAN Adapters 104, Broadband System RAN Adapters 105, Multi-Tenant Call Processing Services 121, Multi-Tenant Call State Database 122, Multi-Tenant Mobility Services 131, Multi-Tenant Mobility Database 132, and Cloud-Based Multi-Tenant Resource Management Service 141. In this exemplary embodiment, LMR System 1 RA 102 is operably coupled with LMR System 1 RAN 112 via link 132, LMR System 2 RA 103 is operably coupled with \LMR System 2 RAN 113 via link 133, LMR System 3 RA 104 is operably coupled with LMR System 3 RAN 114 via link 134, and Broadband System RA 105 is operably coupled with LTE RAN 115 via link 135. In an alternate exemplary embodiment, LMR System 1 RA 102 resides in LMR System 1 RAN 112, LMR System 2 RA 103 resides in LMR System 2 RAN 113, LMR System 3 RA 104 resides in LMR System 3 RAN 114, and Broadband System RA 105 resides in LTE RAN 115.

In accordance with an exemplary embodiment, Call Processing System 101 provides cloud-based call processing for multi-system, multi-tenant, multi-technology calls. Call Processing System 101 also preferably provides a fallback solution should a RAN either not desire or not be able to complete calls using Call Processing System 101. In this scenario, a RAN, such as LMR System 1 RAN 112, includes call processing and resource management functionality so that calls can be processed in standalone, fallback mode. The fallback solution provides a flexible system that can result in a single system, single tenant voice call processing service. In this exemplary embodiment, the fallback solution preferably provides a solution that results in a single system, single tenant access permission database that is kept up to date in real time from the multi-system, multi-tenant database, Multi-Tenant Mobility Database 132.

Call Processing System 101 includes a RAN Adaptation Layer, which is preferably comprised of a plurality of RAN Adapters, such as LMR System RAN Adapters 102, LMR System RAN Adapters 103, LMR System RAN Adapters 104, and Broadband System RAN Adapters 105. The RAN Adapters enable a common call processing solution yet still support different technologies, including LMR and Broadband technologies. In an exemplary embodiment, the RAN Adaptation Layer comprises one RAN Adapter per edge component (for example a RAN Adapter per RF or Console site), termination of the layer 2 message delivery protocol (for example a Transport Layer Security (TLS) link to the sites), conversion of technology specific messages to generic services messages, allocation of RAN specific resources (for example allocating RF channels for LMR sites or console bandwidth for console sites done on a per-RAN Adapter level), and RAN component functionality that is considered unique to the specific service rules associated with a RAN (for example resending call grants to an LMR site when a communication device registers at a site).

In accordance with FIG. 1, LMR System RAN Adapters 102 is coupled to LMR System RAN 112, LMR System RAN Adapters 103 is coupled to LMR System RAN 113, LMR System RAN Adapters 104 is coupled to LMR System RAN 114, and Broadband System RAN Adapters 105 is coupled to LTE System RAN 115.

Figure 2:
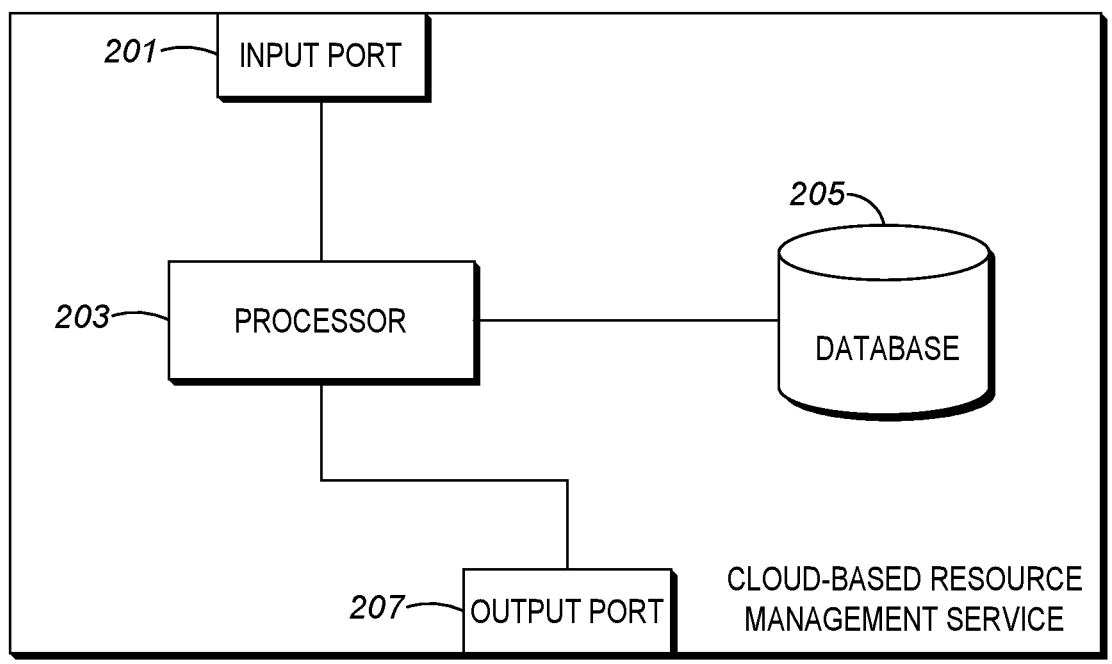
FIG. 2 depicts a schematic diagram of a multi-tenant cloud-based resource management service in accordance with an exemplary embodiment of the present invention.

Multi-Tenant Call Processing Services 121 provides multi-tenant, multi-system, and multi-technology voice call processing service and is depicted in more detail in FIG. 2. In accordance with an exemplary embodiment, Multi-Tenant Call Processing Services 121 is a cloud-based solution that supports multi-tenant voice call processing services and controls at least one access permission database and at least one mobility database, such as Multi-Tenant Mobility Database 132. Multi-Tenant Call Processing Services 121 preferably controls and maintains Multi-Tenant Call State Database 122, for example by writing and reading call information from and to Multi-Tenant Call State Database 122.

Multi-Tenant Call State Database 122 stores the current active call state for every call being processed by Call Processing System 101. the state of the call for active calls, the current audio source of the call, and the priority of the current audio source of the call. The state of the call can be, for example, active voice, hangtime, or call teardown. The current audio source of the call can be, for example, a radio or a console.

Multi-Tenant Mobility Services 131 supports the services necessary to enable radio or console access to the system. In an exemplary embodiment, Multi-Tenant Mobility Services 131 includes the functions of authentication, radio registration, radio affiliation, radio deregistration, console in service, console affiliation, console association, and console out of service. Since the mobility services update and maintain the mobility data associated with these services, access to information in Multi-Tenant Mobility Database 132 preferably flows through Multi-Tenant Mobility Services 131. Therefore, user services, such as group call, preferably access the mobility information via mobility services microservices.

Multi-Tenant Mobility Database 132 preferably stores mobility information for mobile stations and console terminals. In accordance with an exemplary embodiment, Multi-Tenant Mobility Database 132 stores the mobile station (MS) registration state, the MS talkgroup affiliation, the MS site location, the console registration state, and console affiliated talkgroup information. Multi-Tenant Mobility Database 132 can be, for example, an integrated Home Location Register (iHLR), a Gateway HLR (GHLR), a Visitor Location Register (VLR), or a combination of one or more of the above.

In the exemplary embodiment depicted in FIG. 1, LMR System RAN 112 is an ASTRO digital two-way radio communications network that is designed specifically for law enforcement, fire and medical services to communicate with each other during emergency situations. LMR System RAN 112 is a mission critical voice and data communication network and can operate in the 700 MHz, 800 MHz, 900 MHz, UHF and VHF bands for voice and data operation.

In an exemplary embodiment, each of the RANs 112-115 include multiple sites, each site equipped with a plurality of base stations. Each RAN 112-115 also preferably includes software and hardware to allow for fallback operation, which occurs when a RAN desires to operate apart from Call Processing System 101.

In the exemplary embodiment depicted in FIG. 1, LMR System RAN 113 is also an ASTRO digital two-way radio communications network. In this exemplary embodiment, LMR System RAN 113 has a different Wide Area Communications Network (WACN)/System ID information than LMR System RAN 112.

In the exemplary embodiment depicted in FIG. 1, LMR System RAN 114 is a MotoTRBO LMR system that preferably operates in multi-system, cloud-based mode. When the connection between LMR System RAN 114 and Multi-Tenant Call Processing Services 121 goes down, LMR System RAN 114 can fall back to single site operation. This same functionality of falling back to single site operation preferably exists for all RANs in FIG. 1, for example (LMR System RAN 112, LMR System RAN 113, and LTE System RAN 115.

In an exemplary embodiment depicted in FIG. 1, LTE System RAN 115 is an LTE RAN that provides broadband access and services to subscribers.

Cloud-Based Multi-Tenant Resource Management Service 141 processes events coming from devices, services, and applications from multiple communication systems. Cloud-Based Multi-Tenant Resource Management Service 141 creates alarms if needed and notifies operators about them. Cloud-Based Multi-Tenant Resource Management Service 141 preferably comprises multiple services with accompanying databases. In an exemplary embodiment, some of the services are services that get configuration and data from multiple different sources or protocols and transform them to match the logic of the service. One service logic is a business logic which performs exact identification and correlations if there is some indication of an alarm signal or a clear alarms signal. A further service is a whole supporting service for displaying information to a customer.

FIG. 2 depicts a schematic diagram of Cloud-Based Multi-Tenant Resource Management Service 141 in accordance with an exemplary embodiment of the present invention. In the exemplary embodiment depicted in FIG. 2, Cloud-Based Multi-Tenant Resource Management Service 141 includes an input port 201, a processor 203, a database 205, and an output port 207. Input port 201 and processor 203 communicate over one or more communication lines or buses, as do processor 203 and output port 207. Wireless connections or a combination of wired and wireless connections are also possible.

Input port 201 receives electronic signals and messages from RANs 112-115. Output port 207 transmits signals and messages to RANs 112-115. It should be understood that Cloud-Based Multi-Tenant Resource Management Service 141 could include a plurality of input ports and output ports, only one of each is depicted in FIG. 2 for clarity. As described above, each of these RAN Adapters transmits and receives signals and messages from associated RANs. Input port 201 and output port 207 are electrically connected to processor 203. Although depicted in FIG. 2 as two separate elements, input port 201 and output port 207 can be a single element.

Processor 203 may include a microprocessor, application-specific integrated circuit (ASIC), field-programmable gate array, or another suitable electronic device. Processor 203 obtains and provides information (for example, from database 205 and/or input port 201), and processes the information by executing one or more software instructions or modules, capable of being stored, for example, in a random access memory ("RAM") area of database 205 or a read only memory ("ROM") of database 205 or another non-transitory computer readable medium, such as Multi-Tenant Call State Database 122. The software can include firmware, one or more applications, program data, filters, rules, one or more program modules, and other executable instructions. Processor 203 is configured to retrieve from database 205 and execute, among other things, software related to the control processes and methods described herein.

Database 205 can include one or more non-transitory computer-readable media, and may include a program storage area and a data storage area. The program storage area and the data storage area can include combinations of different types of memory, as described herein. In the embodiment illustrated, database 205 stores, among other things, instructions for processor 203 to carry out the method of FIG. 3.

Figure 3:
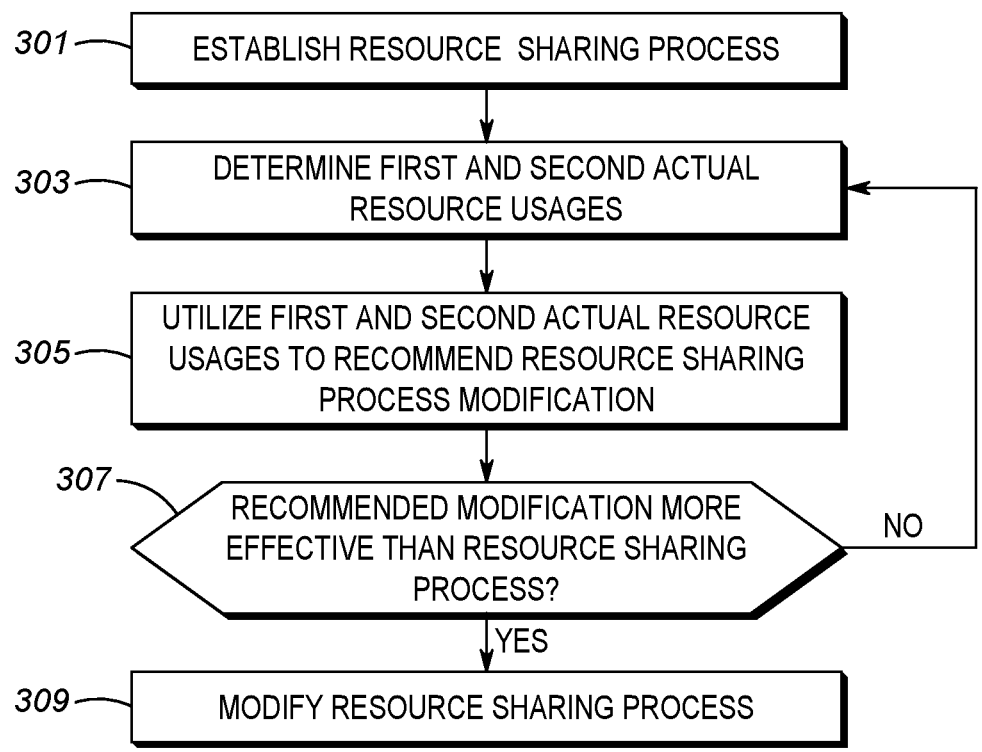
FIG. 3 depicts a flow chart in accordance with an exemplary embodiment of the present invention.

FIG. 3 depicts a flow chart 300 of a method for optimizing a resource sharing process in a multi-tenant communication system. In an exemplary embodiment, It should also be understood that this invention works for two communication systems that are utilizing the same over the air (OTA) protocol, such as LMR ASTRO, LMR MotoTRBO, or LTE, or whether the two OTA protocols are different. This is facilitated at least in part because the resource management functionality is being performed at Cloud-Based Mobility Management Services 141, which is capable of managing resources for multiple technologies, from multiple systems, and for multiple tenants.

In accordance with an exemplary embodiment, Cloud-Based Resource Management Service 141 establishes (301) a resource sharing process.

Cloud-Based Resource Management Service 141 determines (303) a first actual resource usage and a second actual resource usage. The first actual resource usage is preferably the level of resource utilization by the first tenant and the second actual resource usage is the level of resource utilization by the second tenant.

Cloud-Based Resource Management Service 141 utilizes (305) first actual resource usage and second actual resource usage to recommend a resource sharing process modification. In accordance with an exemplary embodiment, Cloud-Based Mobility Management Services 141 detects situations where resource sharing between tenants is possible, such as detecting overloaded and under-loaded sites of two tenants that are proximate to each other. In this exemplary embodiment, Cloud-Based Resource Management Service 141 utilizes the first actual resources and the second actual resources. In this exemplary embodiment, Cloud-Based Resource Management Service 141 utilizes current load on the first and second sites to determine whether to recommend a resource sharing modification. In a further exemplary embodiment, Cloud-Based Resource Management Service 141 utilizes the call priorities on the first site and the second site to determine whether to recommend a resource sharing modification. Cloud-Based Resource Management Service 141 preferably utilizes the first actual resource usage and second actual resource usage to determine patterns showing when sharing of resources between sites that have a resource sharing process may be modified for more effective usage of overall system resources.

Cloud-Based Resource Management Service 141 determines (307) if the recommended modification is more effective than the current resource sharing process. If the recommended modification is not more effective than the resource sharing process, the process returns to step 303.

If Cloud-Based Resource Management Service 141 determines at step 307 that the recommended modification is more effective than the resource sharing process, Cloud-Based Resource Management Service 141 modifies (309) the resource sharing process. In an exemplary embodiment, Cloud-Based Resource Management Service 141 determines if the recommended modification is more effective than the current resource sharing process by determining if the recommended modification provides additional overall throughput, lower cost, or improves resource utilization.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for optimizing a resource sharing process in a multi-tenant call processing system, the method comprising:
    establishing electronically the resource sharing process between a first tenant and a second tenant in the multi-tenant communication system, wherein the first and second tenants utilize the same over-the-air protocol, wherein the resource sharing process establishes (i) a sharing of over-the-air communication channels between the first and second tenants, (ii) a first expected resource usage at the first tenant in connection with the shared communication channels, and (iii) a second expected resource usage at the second tenant in connection with the shared communication channels, and wherein the first actual resource usage comprises (i) first call priorities on the first tenant, and (ii) first utilization patterns associated with the first tenant, and the second actual resource usage comprises (i) second call priorities at the second tenant, and (ii) second utilization patterns associated with the second tenant;
    determining electronically a first actual resource usage at the first tenant in connection with the shared communication channels and a second actual resource usage at the second tenant in connection with the shared communication channels; and
    based on the first actual resource usage and the second actual resource usage electronically:
        determining whether modification to the resource sharing process provides additional overall throughput on the shared communication channels for the first and second tenants;
        in response to determining that modifying the resource sharing process provides additional overall throughput, modifying the resource sharing process to change (i) the actual resource usage at the first tenant in connection with the shared communication channels and (ii) the actual resource usage at the second tenant in connection with the shared communication channels.

2. The method of claim 1, wherein the step of determining electronically the first actual resource usage and the second actual resource usage comprises determining patterns in the first actual resource usage and the second actual resource usage.

3. The method of claim 2, wherein the step of electronically modifying the resource sharing process comprises modifying the resource sharing process based on the patterns in the first actual resource usage and the second actual resource usage.

4. The method of claim 1, wherein the modification to the resource sharing process relates to an availability of the first tenant.

5. The method of claim 1, wherein the modification to the resource sharing process relates to an availability of the second tenant.

6. The method of claim 1, wherein the modification to the resource sharing process relates to a cost of the first tenant.

7. The method of claim 1, wherein the modification to the resource sharing process relates to a cost of the second tenant.

8. A cloud-based resource management service comprising a processor for:
    establishing electronically a resource sharing process between a first tenant and a second tenant in a multi-tenant call processing system, wherein the first and second tenants utilize the same over-the-air protocol, wherein the resource sharing process establishes (i) a sharing of over-the-air communication channels between the first and second tenants, (ii) a first expected resource usage at the first tenant in connection with the shared communication channels, and iii a second expected resource usage at the second tenant in connection with the shared communication channels, and wherein the first actual resource usage comprises (i) first call priorities on the first tenant, and (ii) first utilization patterns associated with the first tenant, and the second actual resource usage comprises (i) second call priorities at the second tenant, and (ii) second utilization patterns associated with the second tenant;
    determining electronically a first actual resource usage at the first tenant in connection with the shared communication channels and a second actual resource usage at the second tenant in connection with the shared communication channels; and
    based on the first actual resource usage and the second actual resource usage electronically:
        determining whether modification to the resource sharing process provides additional overall throughput on the shared communication channels for the first and second tenants;
        in response to determining that modifying the resource sharing process provides additional overall throughput, modifying the resource sharing process to change (i) the actual resource usage at the first tenant in connection with the shared communication channels and (ii) the actual resource usage at the second tenant in connection with the shared communication channels.

9. The cloud-based resource management service of claim 8, wherein the step of determining electronically the first actual resource usage and the second actual resource usage comprises determining patterns in the first actual resource usage and the second actual resource usage.

10. The cloud-based resource management service of claim 9, wherein the step of electronically modifying the resource sharing process comprises modifying the resource sharing process based on the patterns in the first actual resource usage and the second actual resource usage.

11. The cloud-based resource management service of claim 8, wherein the modification to the resource sharing process relates to an availability of the first tenant.

12. The cloud-based resource management service of claim 8, wherein the modification to the resource sharing process relates to an availability of the second tenant.

13. The cloud-based resource management service of claim 8, wherein the modification to the resource sharing process relates to a cost of the first tenant.

14. The cloud-based resource management service of claim 8, wherein the recommended modification to the resource sharing process relates to a cost of the second tenant.

* * * * *